(12) United States Patent
Grether et al.

(10) Patent No.: US 8,177,184 B2
(45) Date of Patent: May 15, 2012

(54) SEAT TRACK ASSEMBLY

(75) Inventors: Martin Grether, Mill Creek, WA (US);
Paul R. Fortado, Everett, WA (US);
Viet Phan, Seattle, WA (US); Gina Pischke, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 851 days.

(21) Appl. No.: 11/643,111

(22) Filed: Dec. 21, 2006

(65) Prior Publication Data

US 2008/0149804 A1 Jun. 26, 2008

(51) Int. Cl.
*A47B 97/00* (2006.01)

(52) U.S. Cl. .............. 248/503.1; 52/223.8; 244/122 R

(58) Field of Classification Search .............. 248/503.1, 248/429, 424; 14/2, 3, 74.5; 244/122 R, 244/118.5, 118.6; 297/311, 344.1; 410/104, 410/105; 384/47, 55; 52/223.8, 837–839, 52/846, 636, 650.1
See application file for complete search history.

(56) References Cited

U.S. PATENT DOCUMENTS

| | | | | |
|---|---|---|---|---|
| 496,466 A * | 5/1893 | White | | 52/838 |
| 995,059 A * | 6/1911 | Danielson | | 248/503.1 |
| 1,005,327 A * | 10/1911 | Schleicher | | 244/13 |
| 1,725,439 A * | 8/1929 | Carns | | 244/129.1 |
| 1,740,053 A * | 12/1929 | Wehr | | 52/839 |
| 1,843,318 A * | 2/1932 | Frease | | 52/690 |
| 3,089,564 A * | 5/1963 | Smittle | | 188/371 |
| 3,141,531 A * | 7/1964 | Montgomery | | 52/634 |
| 4,630,546 A * | 12/1986 | Wiger et al. | | 105/416 |
| 5,178,346 A * | 1/1993 | Beroth | | 244/122 R |
| 5,291,704 A * | 3/1994 | Savorani | | 52/177 |
| 5,412,921 A * | 5/1995 | Tripp | | 52/838 |
| 6,408,591 B1 * | 6/2002 | Yamashita et al. | | 296/146.6 |
| 6,554,225 B1 * | 4/2003 | Anast et al. | | 244/117 R |
| 7,051,978 B2 | 5/2006 | Reed et al. | | |
| 7,093,797 B2 | 8/2006 | Grether et al. | | |
| 7,195,201 B2 | 3/2007 | Grether et al. | | |
| 7,506,855 B2 * | 3/2009 | Frantz et al. | | 248/424 |
| 2005/0211833 A1 * | 9/2005 | Frantz et al. | | 244/118.1 |
| 2005/0211836 A1 | 9/2005 | Frantz et al. | | |
| 2005/0258676 A1 * | 11/2005 | Mitchell et al. | | 297/216.13 |

FOREIGN PATENT DOCUMENTS

WO US2007088467 12/2007

* cited by examiner

*Primary Examiner* — Korie Chan
(74) *Attorney, Agent, or Firm* — Parsons Behle & Latimer

(57) ABSTRACT

A seat track assembly an illustrative embodiment of the seat track assembly includes a seat track having an elongated track plate and a pair of generally elongated, parallel, spaced-apart track flanges extending from the track plate. Each of the track flanges is variable in depth. A method of fabricating a seat track assembly is also disclosed.

17 Claims, 1 Drawing Sheet

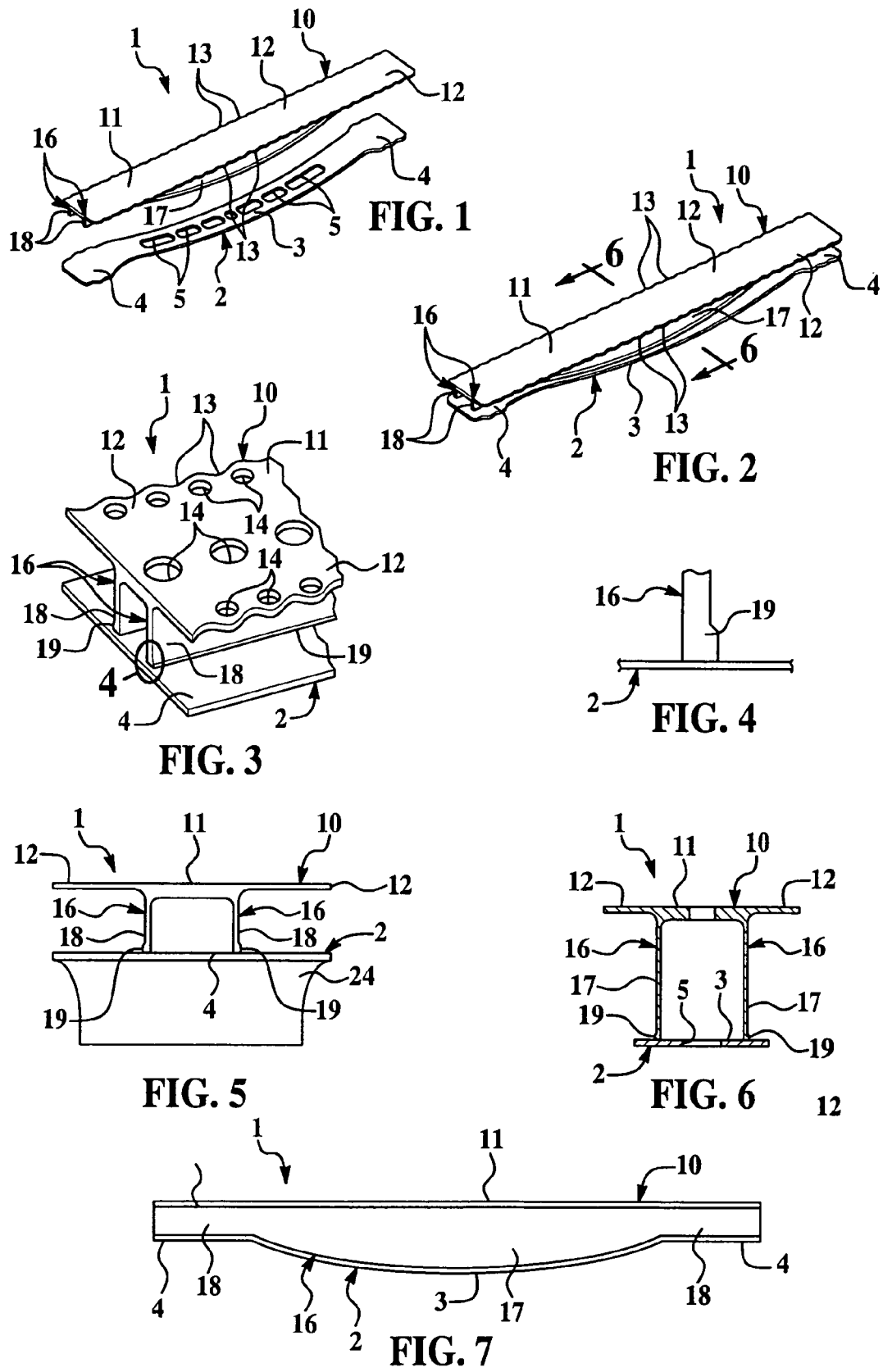

SEAT TRACK ASSEMBLY

FIELD

The present invention relates to seat track assemblies for passenger aircraft. More particularly, the present invention relates to a seat track assembly which is lightweight and has an optimum load bearing configuration.

BACKGROUND

Seat tracks are used in passenger aircraft to anchor passenger seats to the airframe of the aircraft. Conventional seat tracks typically have a "hat" design (a pair of outwardly-extending top flanges and a pair of outwardly-extending middle flanges which together form a top cord and a pair of outwardly-extending bottom flanges which form a bottom cord). The middle flanges are used to attach the track to the airframe.

Seat tracks are used in Passenger Aircraft to attach seats and interior furnishings (e.g. Lavs, galleys, closets). Conventional seat tracks typically have higher internal loads between supports so it is usually advantageous that the track be designed with minimum height at the supports and increased height between supports. Typical extrusion processes for seat track design usually prevent consideration of variable height designs due to the cost of the excess material and its removal. In addition, conventional seat tracks typically are designed as an open I or Pi cross section. These open sections are subject to instability related failures and usually require excess material to react these instability loads.

One of the limitations of the conventional aircraft seat tracks is that the top, middle and bottom flanges are thick to overcome load instability. Moreover, seat tracks are typically extruded. Extrusion is optimal for objects which have a constant or uniform cross-sectional geometry; because an optimized seat track would be thicker at the middle than at the ends of the track since loads are greater at the middle, fabrication of an optimized extruded track would require extensive machining of a large block of metal such as titanium.

SUMMARY

The present invention is generally directed to a seat track assembly. An illustrative embodiment of the seat track assembly includes a seat track having an elongated track plate and a pair of generally elongated, parallel, spaced-apart track flanges extending from the track plate. Each of the track flanges is variable in depth. The term Pi-Box is derived from the Greek letter pi and the lower plate attached creating a closed box. This invention reduces weight by allowing variable height geometry and using an enclosed section. Variable height allows optimization of the cross section height to match internal loads, and the box section reduces instability created by thin gauge materials. A method of fabricating a seat track assembly is also disclosed.

The present invention is further generally directed to a method of fabricating a seat track assembly. An illustrative embodiment of the method includes providing a seat track having an elongated track plate and a pair of generally elongated, parallel, spaced-apart track flanges extending from the track plate, wherein each of the track flanges is variable in depth; and welding a base flange to the track flanges of the seat track.

BRIEF DESCRIPTION OF THE DRAWINGS

The invention will now be described, by way of example, with reference to the accompanying drawings, in which:

FIG. 1 is an exploded perspective view of an illustrative embodiment of a seat track assembly.

FIG. 2 is a perspective view of an illustrative embodiment of the seat track assembly.

FIG. 3 is a perspective view, partially in section, of an end portion of an illustrative embodiment of the seat track assembly.

FIG. 4 is a sectional view, taken along section line 4 in FIG. 3.

FIG. 5 is an end view of an illustrative embodiment of the seat track assembly, attached to an airframe.

FIG. 6 is a cross-sectional view, taken along section lines 6-6 in FIG. 2, of a middle portion of an illustrative embodiment of the seat track assembly.

FIG. 7 is a side view of an illustrative embodiment of the seat track assembly.

DETAILED DESCRIPTION

Referring to the drawings, an illustrative embodiment of the seat track assembly is generally indicated by reference numeral 1. The seat track assembly 1 includes a generally elongated base flange 2 which is typically titanium. In some embodiments, the base flange 2 is a constant gauge base flange 2; in other embodiments, the base flange 2 is a variable gauge base flange 2. The base flange 2 includes a generally elongated, curved center segment 3. A generally straight end segment 4 terminates each end of the center segment 3. In some embodiments, multiple lightening apertures 5 are provided in the center segment 3 in adjacent, spaced-apart relationship with respect to each other. Each lightening aperture 5 typically has a generally elongated, rectangular shape.

A Pi-Box type seat track 10 is provided on the base flange 2. The seat track 10 is typically titanium and includes a generally elongated, rectangular track plate 11. In some embodiments, the seat track 10 is extruded; in other embodiments, the seat track 10 is machined from a block of metal such as titanium. The track plate 11 has a pair of opposite edge portions 12. As shown in FIGS. 1-3, in some embodiments, multiple plate notches 13 are provided in each edge portion 12 of the track plate 11. As shown in FIG. 3, in some embodiments, multiple plate apertures 14 are provided in the track plate 11 to facilitate attachment of a passenger seat (not shown) to the seat track assembly 1.

A pair of elongated track flanges 16 extends from the track plate 11 of the seat track 10 in generally parallel, spaced-apart relationship with respect to each other. Each of the track flanges 16 is welded and/or otherwise attached to the base flange 2. As shown in FIGS. 5-7, each track flange 16 includes a center flange segment 17 which typically has a generally curved shape in side view, as particularly shown in FIG. 7. A generally straight end flange segment 18 extends from each end of the center flange segment 17. As further shown in FIGS. 5-7, the center flange segment 17 has a depth which is greater than that of each end flange segment 18; therefore, the contour or shape of the center flange segment 17 and end flange segment 18 of each track flange 16 is generally complementary in shape to the center segment 3 and each end segment 4, respectively, of the base flange 2. In some embodiments, each track flange 16 has a constant thickness; in other embodiments, each track flange 16 has a variable thickness. As shown in FIGS. 4-6, in some embodiments of the seat track assembly 1, a flange lip 19 is provided in the extending or distal edge of each track flange 16 which is attached to the base flange 2 for reinforcement and uniform load distribution purposes.

As shown in FIG. 5, in typical use of the seat track assembly 1, the base flange 2 is bolted and/or otherwise attached to a portion of an airframe 24 which forms the floor of a passenger aircraft (not shown). Passenger seats (not shown) are bolted (by the extension of bolts through the plate apertures 14) and/or otherwise attached to the edge portions 12 on the track plate 11 of the seat track 10 using techniques which are well-known to those skilled in the art. During weight loading of the passenger seats, the center flange segment 17 bears a greater load than the end flange segments 18 of each track flange 16. Accordingly, the greater depth or thickness of the center flange segment 17 relative to that of the end flange segments 18 of each track flange 16 enable the seat track assembly 1 to effectively withstand the weight dynamics which are associated with loading and unloading of the passenger seats. This enhances stability of the seat track 10 at high weight loads. Due to the greater depth or thickness of the center flange segment 17 relative to that of each end flange segment 18 of each track flange 16, each seat track assembly 1 is lighter than the conventional seat track assembly, in which the thickness of each track flange 16 is substantially uniform throughout the length of each.

Although this invention has been described with respect to certain exemplary embodiments, it is to be understood that the specific embodiments are for purposes of illustration and not limitation, as other variations will occur to those of ordinary skill in the art.

What is claimed is:

1. A seat track assembly, comprising:
   a seat track having an elongated track plate and a pair of generally elongated, parallel, spaced-apart track flanges extending downwardly from said track plate, said track plate extending outwardly from said track flanges;
   a base flange wherein said track flanges are carried by said base flange, forming, in combination, a closed shape, said base flange having a longitudinally extending downwardly arched center segment, said arched center segment extending over a major portion of a length of said base flange, a plurality of spaced apart lightening apertures provided in said center segment of said base flange, said base flange adapted to be attached to an upper surface of a floor structure, said base flange extending outwardly from said track; and
   wherein each of said track flanges is variable in depth, each of said track flanges comprising a greater depth at a central portion compared to end portions of each said track flanges.

2. The seat track assembly of claim 1 wherein each of said track flanges is variable in thickness.

3. The seat track of claim 1 wherein said base flange further comprises a pair of generally straight end segments each extending from a respective end of said center segment.

4. The seat track of claim 1 wherein each of said track flanges comprises a generally curved center flange segment comprising said arched center segment and a pair of end flange segments each extending from a respective end of said center flange segment, each of said track flanges complementary in shape to a respective base flange.

5. The seat track of claim 4 wherein said center flange segment is greater in depth than each of said pair of end flange segments.

6. The seat track of claim 1 further comprising a flange lip provided on each of said track flanges.

7. A seat track assembly, comprising:
   a seat track having an elongated track plate and a pair of generally elongated, parallel, spaced-apart track flanges extending downwardly from said track plate, said track plate extending outwardly from said track flanges;
   a plurality of plate apertures provided in said track plate;
   a base flange wherein said track flanges are carried by said base flange forming, in combination, a closed shape, said base flange having a longitudinally extending downwardly arched center segment, said arched center segment extending over a major portion of a length of said base flange, a plurality of spaced apart lightening apertures provided in said center segment of said base flange, said base flange adapted to be attached to an upper surface of a floor structure, said base flange extending outwardly from said track flanges; and,
   wherein each of said track flanges is variable in depth, each of said track flanges comprising a greater depth at a central portion compared to end portions of each of said track flanges.

8. The seat track assembly of claim 7 wherein each of said track flanges is variable in thickness.

9. The seat track of claim 7 wherein said base flange further comprises a pair of generally straight end segments extending from said center segment.

10. The seat track of claim 7 wherein each of said track flanges comprises a generally curved center flange segment comprising said arched center segment and a pair of end flange segments each extending from a respective end of said center flange segment.

11. The seat track of claim 10 wherein said center flange segment is greater in depth than each of said pair of end flange segments.

12. The seat track of claim 7 further comprising a flange lip provided on each of said track flanges.

13. The seat track of claim 1 wherein said seat track assembly is a passenger aircraft seat track assembly.

14. The seat track of claim 7 wherein said seat track assembly is a passenger aircraft seat track assembly.

15. An aircraft seat track assembly, comprising:
   a seat track having an elongated track plate and a pair of generally elongated, parallel, spaced-apart track flanges extending downwardly from said track plate, said track plate extending outwardly from said track flanges;
   a base flange wherein said track flanges are carried by said base flange forming, in combination, a closed shape, said base flange having a longitudinally extending downwardly arched center segment, said arched center segment extending over a major portion of a length of said base flange, a plurality of spaced apart lightening apertures provided in said center segment of said base flange, said base flange adapted to be attached to an upper surface of a floor structure, said base flange extending outwardly from said track; and
   wherein each of said track flanges is variable in depth, each of said track flanges comprising a greater depth at a central portion compared to end portions of each said track flanges.

16. The seat track of claim 15 wherein said base flange further comprises a pair of generally straight end segments each extending from a respective end of said center segment.

17. The seat track of claim 15 wherein each of said track flanges comprises a generally curved center flange segment comprising said arched center segment and a pair of end flange segments each extending from a respective end of said center flange segment, each of said track flanges complementary in shape to a respective base flange.

* * * * *